United States Patent [19]

Martin et al.

[11] 4,234,198
[45] Nov. 18, 1980

[54] WATER SEAL ASSEMBLY FOR ENGINES

[75] Inventors: Gary G. Martin, Morton; James C. Smith, Washington, both of Ill.

[73] Assignee: Caterpillar Tractor Co., Peoria, Ill.

[21] Appl. No.: 731,605

[22] Filed: Oct. 12, 1976

[51] Int. Cl.³ .............................................. F16J 15/10
[52] U.S. Cl. ............................ 277/145; 277/147; 277/190
[58] Field of Search .......... 271/147, 144, 145, 206 R, 271/168, 190, 191, 198, 165

[56] References Cited

U.S. PATENT DOCUMENTS

| | | | |
|---|---|---|---|
| 1,241,770 | 10/1917 | Saxton | 277/145 |
| 1,356,393 | 10/1920 | Nolte | 277/198 |
| 2,684,882 | 7/1954 | Fernandez | 277/145 |
| 2,935,365 | 5/1960 | Dega | 277/165 |
| 3,591,190 | 7/1971 | Winay | 277/147 |
| 3,603,618 | 9/1971 | Stratton | 277/101 |

Primary Examiner—Lenard A. Footland
Attorney, Agent, or Firm—Phillips, Moore, Weissenberger, Lempio & Majestic

[57] ABSTRACT

An engine comprises a pair of members, such as a pair of adjacent cylinder heads, having a common passageway formed therein to communicate a coolant therethrough. An annular seal assembly is disposed between the members to provide a static seal preventing the egress of coolant thereby. The seal assembly comprises an annular ferrule having an annular elastomeric seal disposed circumferentially thereabout. A V-shaped groove is formed circumferentially on the periphery of the seal to seat a like-shaped portion of the ferrule therein. A strap-type clamp circumferentially surrounds the seal to apply a clamping force thereon to wedge the ferrule into the V-shaped groove of the seal to expand sidewalls of the seal into sealing contact with the members.

6 Claims, 3 Drawing Figures

WATER SEAL ASSEMBLY FOR ENGINES

BACKGROUND OF THE INVENTION

This invention relates to a seal assembly disposed between a pair of stationary members employed on an engine and having a common passageway formed therein to communicate coolant therethrough. Heretofore, O-ring seals and the like have been employed to effect a static seal in the passageway and between the members. Such seals have given rise to installation, leakage and servicing problems. These problems have been largely overcome by employing an adjustable clamp on the seal to expand it axially between the members. A seal assembly of this latter type is disclosed in U.S. Pat. No. 3,603,618, assigned to the assignee of this application.

SUMMARY OF THIS INVENTION

An object of this invention is to provide an improved seal assembly of the above type, particularly adapted for applications in the cooling systems of internal combustion engines. The seal assembly comprises an annular ferrule having a generally V-shaped camming portion and a pair of flanges connected to the camming portion and an annular elastomeric seal circumferentially disposed thereabout. A clamping means circumferentially surrounds the seal and the camming portion of the ferrule is at least partially disposed in a V-shaped groove formed in the seal to apply a clamping force radially inwardly on the seal to expand sidewalls thereof into sealing contact with a pair of adjacent members.

BRIEF DESCRIPTION OF THE DRAWINGS

Other objects of this invention will become apparent from the following description and accompanying drawings wherein.

DETAILED DESCRIPTION

Figure 1:
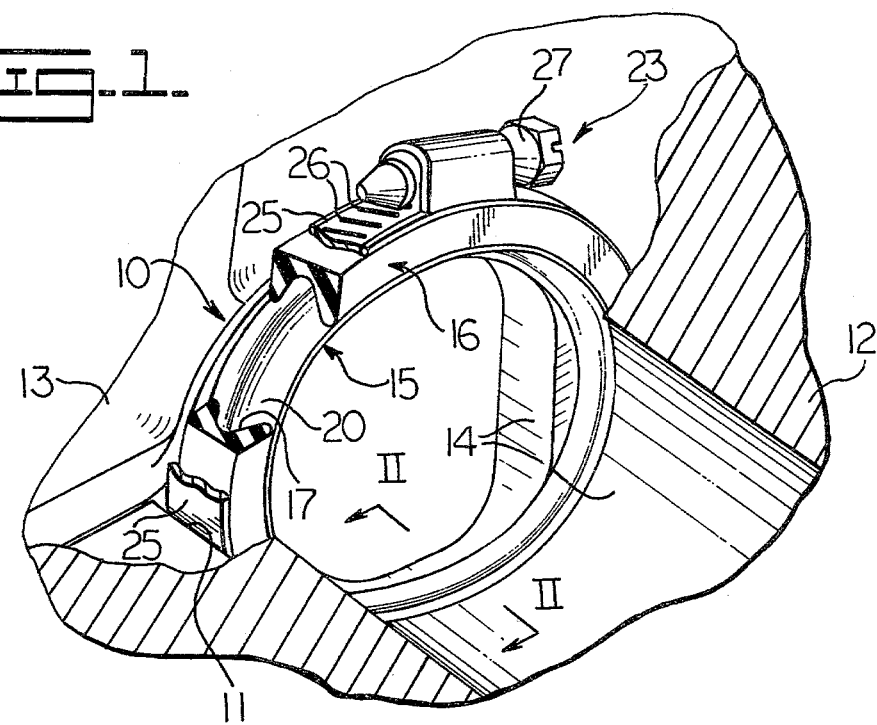
FIG. 1 is a partially sectioned isometric view of a seal assembly embodying this invention, shown disposed between a pair of adjacent members to form a static seal about a common passageway formed therein.

FIG. 1 illustrates a seal assembly 10 disposed in an annular cut-out 11 between a pair of adjacent members 12 and 13, such as a pair of adjacent cylinder heads employed on an internal combustion engine. A common passageway 14 is formed in the members to communicate fluid therebetween, such as water or oil. As will be hereinafter fully described, the seal assembly is adapted to be expanded axially from its unclamped condition illustrated in FIG. 2 to its clamped condition illustrated in FIG. 3 to provide a static seal between the members to prevent the egress of fluid thereby from passageway 14.

Figure 2:
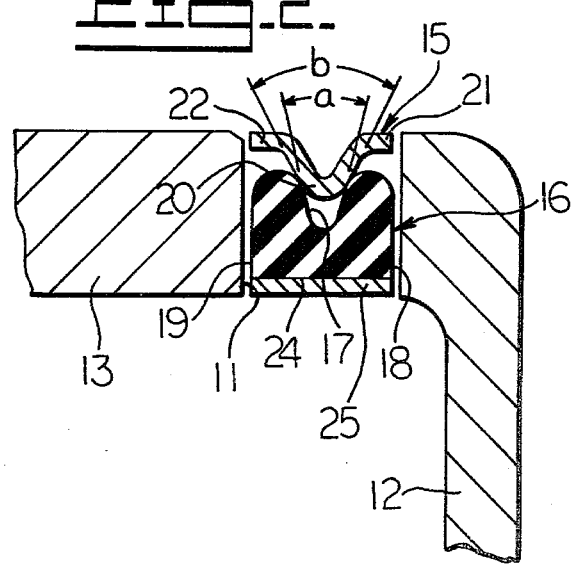
FIG. 2 is a cross sectional view of the seal assembly, taken in the direction of arrows II—II in FIG. 1, illustrating the seal assembly in its unclamped condition between the members.

Referring to FIGS. 1 and 2, the seal assembly comprises an annular ferrule 15 having an annular elastomeric seal 16 circumferentially surrounding the same. A generally V-shaped groove 17 is formed circumferentially on the periphery of the seal and between sidewalls 18 and 19 thereof. When viewed in cross section, the ferrule comprises a generally V-shaped outer camming portion 20 at least partially disposed in groove 17 and a pair of flanges 21 and 22 connected to opposite ends of portion 20 of the ferrule.

Figure 3:
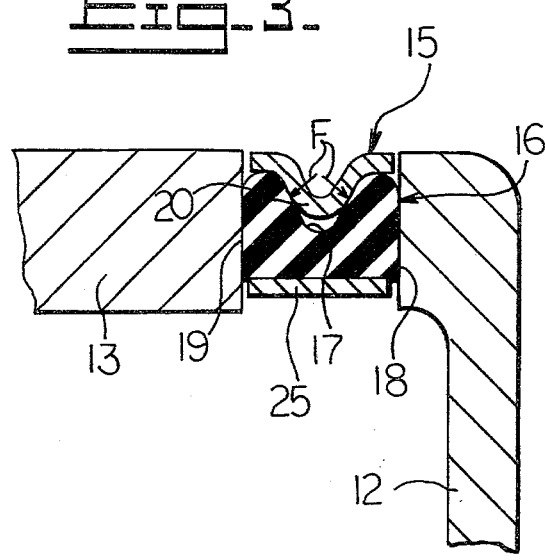
FIG. 3 is a view similar to FIG. 2, but illustrating the seal assembly in its clamped condition between the members to form a static seal therebetween.

A clamping means 23 circumferentially surrounds the seal for applying a clamping force radially inwardly on an outer flat surface 24 of the seal to expand sidewalls 18 and 19 thereof into sealing contact with members 12 and 13, respectively, as illustrated in FIG. 3. The clamping means may be of standard design comprising a flexible strap 25 having a plurality of slots 26 formed therein to engage the spiralled threads (not shown) of a screw 27. Thus, selective rotation of the screw in either direction will either contract or expand strap 25 in a conventional manner.

As shown in FIG. 2, groove 17 of the seal is defined by an included angle "a" which is preferably selected from the range of from 10° to 60° with such angle approximating 32° in FIG. 2. The outer camming surfaces formed on V-shaped portion 20 of ferrule 15 are preferably disposed at an included angle "b" of from 30° to 90° with such angle closely approximating 83° in FIG. 2. However, it should be understood that in any combination of angles "a" and "b", that angle "a" will be less than angle "b" to apply the desired wedging forces F to the seal, as illustrated in FIG. 3.

As further shown in FIG. 3, camming portion 20 of the ferrule and groove 17 are preferably constructed and arranged so that the ferrule do not "bottom-out" on the seal. Such an arrangment facilitates subsequent tightening of clamping means 23, if needed. The flexible lips thus defined on the seal by groove 17 assure that air entrapped in the groove will escape therefrom upon tightening of the clamping means. Flanges 21 and 22 aid in applying a closely controlled and evenly distributed clamping force to the seal.

The seal is preferably composed of a relatively low friction material, such as a suitably composed rubber-based material, which will tend to slide over camming portion 20 of the ferrule to exert the desired sealing forces between members 12 and 13. However, it should be understood that other elastomeric materials may be used for the seal, as is well known by those skilled in the arts relating hereto. Ferrule 15 and clamping means 23 may be composed of a stainless steel or like material which is non-corrosive when subjected to coolants, such as water.

What is claimed is:
1. A seal assembly comprising
   a circumferentially uninterrupted annular ferrule formed as a rigid, one-piece construction, including a generally V-shaped camming portion and a pair of flanges each connected to an end of said camming portion,
   a circumferentially uninterrupted annular elastomeric seal circumferentially surrounding said ferrule and having a generally V-shaped groove formed circumferentially thereabout and between sidewalls thereof, the camming portion of said ferrule at least partially disposed in sliding relationship in said groove, and
   clamping means circumferentially surrounding said seal for applying a clamping force thereon to expand the sidewalls thereof outwardly away from each other and against the rigid backing of said ferrule.

2. The seal assembly of claim 1 wherein said groove is defined by an included angle which is less than an included angle defining the camming portion of said ferrule disposed in said groove.

3. The seal assembly of claim 2 wherein the included angle defining said groove is selected from the range of from 10° to 60° and wherein the included angle defining the camming portion of said ferrule disposed in said groove is selected from the range of said 30° to 90°.

4. The seal assembly of claim 2 wherein the included angle defining said groove approximates 32° and wherein the included angle defining the camming portion of said ferrule disposed in said groove approximates 83°.

5. The seal assembly of claim 1 wherein said clamping means comprises a strap having a plurality of slots formed therein and a screw threadably mounted on said strap and having threads thereof engaged in said slots whereby rotation of said screw will expand or contract said strap.

6. The seal assembly of claim 1 further comprising a pair of adjacent members defining a common passageway therein and wherein the sidewalls of said seal are expanded axially into sealing contact between said members.

* * * * *